Aug. 8, 1967  H. P. HENDERSON  3,334,772
INDUSTRIAL CLOSURE
Filed Dec. 10, 1964
FIG. 1.
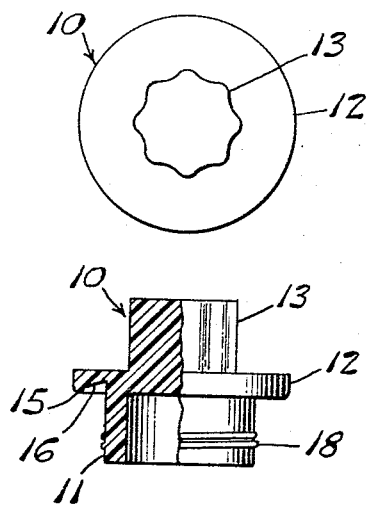
FIG. 2.
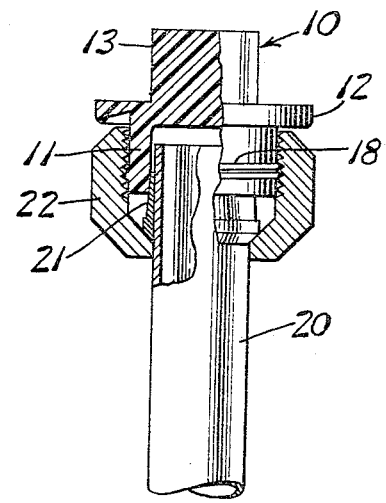
FIG. 3.
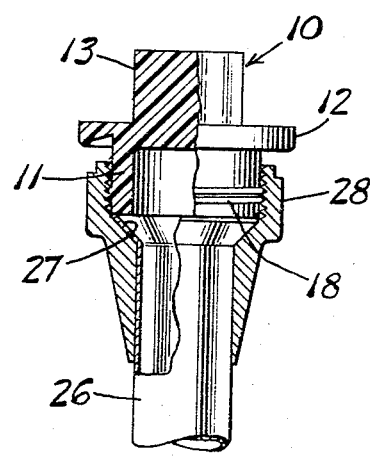
FIG. 4.
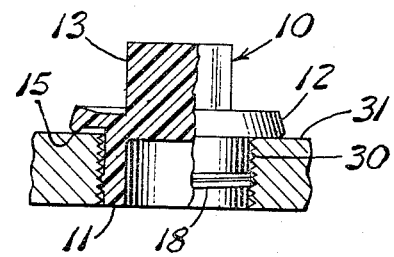
FIG. 5.
INVENTOR.
HAROLD P. HENDERSON
BY
Christel & Bean
ATTORNEYS

… … …

3,334,772
Patented Aug. 8, 1967

3,334,772
INDUSTRIAL CLOSURE
Harold P. Henderson, Tonawanda, N.Y., assignor to Glass-Tite Industries, Inc., Meadville, Pa.
Filed Dec. 10, 1964, Ser. No. 417,371
7 Claims. (Cl. 220—39)

ABSTRACT OF THE DISCLOSURE

A yieldable thermoplastic protective closure for pipe fittings having a hollow cylindrical end portion, an intermediate radially outstanding flange and a manipulating portion at its other end, with the exterior of the hollow cylindrical portion having several thread convolutions midway of its length. The yieldable hollow cylindrical portion may be pressed into a female threaded member whereby the cylindrical portion yields inwardly and the threads snap into engagement with the female threads.

---

This invention relates to industrial closures and particularly to molded thermoplastic closures of the plug or cap type such as are used as temporary protecting and sealing devices for tubing, piping or other outlets of machinery and other apparatus.

Molded thermoplastic closures which are merely cap or cup-shaped members are frequently applied over the protruding ends of pipes, tubing and conduits of various kinds to protect such ends from damage prior to actual installation of the apparatus and for sealing the openings of such projecting pipes, tubing or conduits.

The present invention provides a thermoplastic plug type closure which is externally threaded and which is adaptable to various standard hydraulic tube fittings of both the so-called flare type and the flareless type, as well as to internally threaded openings in machinery or other apparatus, and for other closure applications. The manner in which the threaded plug fitting of the present invention cooperates with standard and special outlets of various types will best be understood from the following disclosure of a representative form of closure of the present invention, and several modes of application thereof to such varied types of outlets.

While the single representative embodiment of the closure or plug of the present invention is illustrated in the accompanying drawing and described in detail herein and is shown and described in several modes of use thereof, it is to be understood that such embodiment is by way of example only and that various mechanical modifications may be made therein without departing from the spirit or scope of the present invention, such scope being limited only as defined in the appended claims. Furthermore, other and varied uses may be made in addition to those set forth herein by way of illustration.

In the drawing:

FIG. 1 is a top plan view of one form of the closure of the present invention;

FIG. 2 is an elevational view of the closure of FIG. 1 with a portion thereof broken away for added illustration;

FIG. 3 is a longitudinal cross-sectional view through a standard so-called flareless hydraulic tube fitting showing the closure of FIGS. 1 and 2 applied thereto;

FIG. 4 is a similar cross-sectional view through a standard flare type hydraulic tube fitting with the same closure applied thereto as in FIG. 3; and FIG. 5 is a similar view showing the fitting of FIGS. 1 and 2 applied to an internally threaded opening.

Like characters of reference denote like parts throughout the several figures of the drawing. In the present instance a typical molded cap or closure of the present invention is shown in detail in FIGS. 1 and 2 and in three different applications, which would normally require different types of plugs or caps, in FIGS. 3, 4 and 5. Before proceeding to a description of these three typical modes of use of the cap or plug of the present invention, the form of the latter shown herein by way of example will first be described with reference particularly to FIGS. 1 and 2.

A molded thermoplastic cap or plug member, designated generally by the reference numeral 10 in several figures of the drawing, comprises a lower annular skirt portion 11, a medial outwardly projecting flange portion 12, and a manipulating head portion 13 at its upper end. Flange portion 12 has a projecting bead portion 15 at its lower surface and a tapering recessed surface portion 16 at its under surface for a purpose which will presently appear.

In the present instance the head portion 13 is of less diameter than the skirt portion 11 and in fact of less diameter than the inside diameter of such skirt portion.

It is to be understood, however, that the relative diameters of the skirt portion 11 and head portion 13 may vary and the latter may be large enough so that the opening in the skirt portion 11 may extend up into head portion 13 when and as required.

The skirt 11 of plug or cap 10 is provided at its exterior periphery with a raised thread formation 18 which in the present instance comprises only about two turns and leaves the major portion of the exterior periphery of skirt 11 of plain cylindrical form. This facilitates molding the closure since the resilience of thermoplastic material of the general nature contemplated herein, for instance polyethylene, is sufficient to permit pulling the plug from the mold in some cases without unscrewing the same because of the radial compressibility of the hollow skirt.

Furthermore, the placement of threads 18 medially along skirt 11 provides a plain cylindrical outer portion of skirt 11 which is freely insertable in the threaded member of the conduit, or other parts to which the closure is being applied, to a degree sufficient to insure relative accurate axial alinement of the plug and thus facilitate starting the threads without crossing or jamming. Furthermore, in certain instances of use tubing portions of the apparatus to which the closure is applied extend into the opening in skirt 11, as for instance, in the embodiment of FIG. 3 hereof.

It will be noted from FIG. 1 that the end portion 13 of the closure in the form illustrated and described herein is non-circular, in the present instance, scalloped as shown, whereby an appropriately formed socket wrench may be applied to apply or remove the closure.

FIG. 3 shows the closure of the present invention applied to what is known in the hydraulic art as a flareless hydraulic tube connection. In FIG. 3 the numeral 20 designates a tubular member having a ferrule 21 pressed thereon and a gland type nut 22 which fits loosely on tube 20 and generally encloses ferrule 21. In using the fitting thus described a companion fitting enters the gland nut 22 in a manner well known in the hydraulic art but machinery and various kinds of apparatus are often shipped with the tubular member 20 and gland nut 22 exposed and subject to damage unless protected.

In applying the closure 10 to the foregoing hydraulic fitting the outer end of the skirt 11 of the closure is forced between ferrule 21 and the interior of gland nut 22 with the interior surfaces of skirt 11 thus forced or wedged against the tapered surface of ferrule 21 to effect a close seal with respect to the interior of tube 20.

Closure 10 may merely be screwed into the position illustrated in FIG. 3 or in many cases it may be tapped straight into the space between tube 20 and nut 22, the closure possessing sufficient resilience to permit the threads 18 to be driven past the female threads of nut 22 until a sufficient depth of penetration of skirt 11 is effected, whereupon the threads 18 of the closure will engage the nearest internal threads of the nut 22 and be arrested thereby against outward movement of closure 10.

It will be noted that flange 12 overlies the end of gland nut 22 and thus protects the end surface thereof and the internal threads adjacent to such end surface. Removal of closure 10 is effected by merely unscrewing the same, by hand or by means of a wrench, as circumstances dictate.

FIG. 4 shows the application of the closure of FIGS. 1 and 2 to a standard flare type hydraulic tube fitting, which fitting comprises a tubular member 26 which is flared outwardly at its end as indicated at 27 in FIG. 4 and has loosely mounted thereon a nut 28 which is slidable along the tube and has a companion internal beveled portion to fit the flare 27 of the tube.

Here again, the manner in which such fitting is connected to a companion fitting in establishing a fluid-tight connection is well known in the hydraulic art. In the present instance the radial end face of the skirt portion 11 of closure 10 abuts against the outer end of the flare formation 27 of tube 26 to seal the interior of tube 26. The cooperation of threads 18 of closure 10 and the internal threads of nut 28 is the same as described in connection with nut 22 of FIG. 3.

Here again, also, flange 12 overlies the outer end of nut 28 to protect such outer end and the internal threads adjacent thereto. However, it will be noted with respect to both FIGS. 3 and 4 that flange 12 is spaced outwardly in an axial direction from the corresponding ends of the nuts 22 and 28, respectively, so as not to interfere with proper sealing engagement of the end of skirt 11. In both of the foregoing applications the closure 10 holds the nut, 22 or 28 as the case may be, against sliding along the tubing.

FIG. 5 shows the application of the closure of FIGS. 1 and 2 to a tapped hole 30 in a wall 31 which may comprise the wall of a machine or gear casing or any other housing or enclosure wherein the problem exists of closing a tapped opening to seal the housing or enclosure against fluid leakage and to protect the threads of the tapped hole.

It is in applications of the general type illustrated in FIG. 5 that the bead and recess formation of the underside of flange 12 comes into play. As shown in FIG. 5, the closure 10 is threaded or driven into the tapped opening 30 to a point where the bead 15 seats securely against the adjacent outer surface of wall 31. Note, as shown in FIG. 5, that the taper 16 permits substantial deflection of flange 12 without interference so that bead 15 may seat resiliently but securely against surface 31 even though the latter be irregular, as for instance the unfinished surfaces of castings and the like. Here again, the closure may be merely forced directly into the tapped opening or may be threaded therein by rotation.

The conformation of the foregoing closure is such that the molding of closures of various sizes is simplified and rendered more economical by virtue of the fact that companion mold parts, one having a cavity for forming the head portion and the other for forming the skirt portion, may be variously interchanged and used in various combinations. Thus one mold part bearing the head portion cavity may be used with any one of several companion mold parts bearing skirt mold cavities of various sizes or various forms.

What is claimed is:

1. An industrial closure of yieldable thermoplastic material comprising a cylindrical portion at one end thereof and a head portion at the opposite end thereof, a medial flange between said end portions and projecting radially outwardly beyond said cylindrical portion and said head portion, an axial opening in the outer end of said cylindrical portion whereby said cylindrical portion comprises a radially compressible annular wall, and thread formations projecting from the periphery of said cylindrical formation, said thread formations occupying only a minor fraction of the length of said cylindrical portion and lying substantially medially between the outer end thereof and said flange.

2. An industrial closure of yieldable thermoplastic material comprising a cylindrical portion at one end thereof and a head portion at the opposite end thereof, a medial flange between said end portions and projecting radially outwardly beyond said cylindrical portion and said head portion, an axial opening in the outer end of said cylindrical portion, whereby said cylindrical portion comprises a radially compressible annular wall, and thread formations projecting from the periphery of said cylindrical formation.

3. An industrial closure of yieldable thermoplastic material comprising a cylindrical portion at one end thereof and a head portion at the opposite end thereof, a medial flange between said end portions and projecting radially outwardly beyond said cylindrical portion and said head portion, said head portion being non-circular whereby a wrench may be applied thereto, an axial opening in the outer end of said cylindrical portion whereby said cylindrical portion comprises a radially compressible annular wall, and thread formations at the periphery of said cylindrical formation, said thread formations occupying only a minor fraction of the length of said cylindrical portion and lying substantially medially between the outer end thereof and said flange.

4. An industrial closure of yieldable thermoplastic material comprising a cylindrical portion at one end thereof and a head portion at the opposite end thereof, a medial flange between said end portions and projecting radially outwardly beyond said cylindrical portion and said head portion, said head portion being non-circular whereby a wrench may be applied thereto, an axial opening in the outer end of said cylindrical portion whereby said cylindrical portion comprises a radially compressible annular wall, and thread formations at the periphery of said cylindrical formation.

5. An industrial closure of yieldable thermoplastic material comprising a cylindrical portion at one end thereof and a head portion at the opposite end thereof, a medial flange between said end portions and projecting radially outwardly beyond said cylindrical portion and said head portion, said flange having an annular bead formation at the side thereof adjacent to said cylindrical portion for sealing engagement with a work surface, an axial opening in the outer end of said cylindrical portion whereby said cylindrical portion comprises a radially compressible annular wall, and thread formations at the periphery of said cylindrical formation.

6. An industrial closure of yieldable thermoplastic material comprising a cylindrical portion at one end thereof and a head portion at the opposite end thereof, a medial flange between said end portions and projecting radially outwardly beyond said cylindrical portion and said head portion, said flange having an annular bead formation adjacent to its outer margin at the side thereof adjacent to said cylindrical portion for sealing engagement with a work surface, an axial opening in the outer end of said cylindrical portion whereby said cylindrical portion comprises a radially compressible annular wall, and thread formations at the periphery of said cylindrical formation.

7. An industrial closure of yieldable thermoplastic material comprising a cylindrical portion at one end thereof and a head portion at the opposite end thereof, a medial flange between said end portions and projecting radially outwardly beyond said cylindrical portion and said head portion, said flange having an annular bead formation adjacent to its outer margin at the side thereof adjacent to said cylindrical portion for sealing engagement with a work surface, the surface of said flange between said bead formation and said cylindrical formation tapering from the former to the latter in a direction away from the outer end of said cylindrical formation, an axial opening in the outer end of said cylindrical portion whereby said cylindrical portion comprises a radially compressible annular wall, and thread formations at the periphery of said cylindrical formation.

References Cited

UNITED STATES PATENTS

| | | | |
|---|---|---|---|
| 2,426,332 | 9/1947 | Acres | 220—39 |
| 3,185,507 | 5/1965 | Laurizio | 220—39 |
| 3,255,916 | 6/1966 | Rice | 220—39 |

THERON E. CONDON, *Primary Examiner.*

JAMES B. MARBERT, *Examiner.*